US006543789B2

(12) United States Patent

Frenzel et al.

(10) Patent No.: US 6,543,789 B2
(45) Date of Patent: Apr. 8, 2003

(54) CHUCK FOR A BORING TOOL

(75) Inventors: Jens Frenzel, Landsberg (DE); Uto Plank, Freising (DE); Helmut Nussrainer, Isen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/859,870

(22) Filed: May 17, 2001

(65) Prior Publication Data

US 2002/0067008 A1 Jun. 6, 2002

(30) Foreign Application Priority Data

May 25, 2000 (DE) ........................................ 100 26 021

(51) Int. Cl.[7] ............................................ B23B 31/103

(52) U.S. Cl. ........................................ 279/74; 279/19.4

(58) Field of Search ........................... 279/19.4, 35, 37, 279/24, 29, 74, 75, 82, 906

(56) References Cited

U.S. PATENT DOCUMENTS

| | | | | | |
|---|---|---|---|---|---|
| 3,788,658 | A | * | 1/1974 | Benjamin et al. | 279/75 |
| 5,709,391 | A | * | 1/1998 | Arakawa et al. | 279/19.4 |
| 6,135,461 | A | * | 10/2000 | Below et al. | 279/19.4 |

* cited by examiner

*Primary Examiner*—Steven Wong
(74) *Attorney, Agent, or Firm*—Sidley Austin Brown & Wood, LLP

(57) ABSTRACT

A chuck for receiving a tool shank of a boring tool and including radially displaceable engagement members (5) formlockingly engageable in the radial recesses (3) formed in the clamp region of the tool shank, an axially displaceable control sleeve (6) for radially displacing the engagement members between their engagement and release positions, and a resilient holding member (8) arranged between the control sleeve (6) and the clamp region of the tool shank and having a detent element (9) for preventing displacement of the control sleeve into its locking position (7) from its release position (10) into which the control sleeve was displaced upon insertion of the boring tool.

12 Claims, 7 Drawing Sheets

CHUCK FOR A BORING TOOL

BACKGROUND OF THE INVENTION

1. Field of the Invention.

The present invention relates to a chuck for a boring tool (boring bit) for use in a percussion hand-held power tool such as a hammer drill or chisel hammer.

2. Description of the Prior Art

For an appropriate use, a tool insertable in a chuck should be secured in the chuck for joint rotation therewith and for a limited axial displacement relative thereto. To this end, the chuck is provided with radially displaceable engagement members which engage in radial recesses formed in the clamp region of the tool shank and limit the axial displacement of the tool to the axial length of the recesses. The engagement members provide for transmission of the rotational torque to the tool, engaging in the catch grooves formed in the clamp region of the tool shank. The blows are applied to the axial end surface of the tool shank and, thus, not to the chuck.

U.S. Pat. No. 5,398,946 discloses a chuck in which a ball is used as locking means. The ball formlockingly engages in an axially limited radial recess of a formlockingly received tool shank. The ball is displaceable along a chamfer radially outwardly, insuring axial displacement of the tool for releasing the tool. To provide for insertion or withdrawal of the tool, an axially displaceable outer sleeve is displaced against a preloaded force of a holding spring along the chuck. The drawback of this chuck consists in that it occupies a stable position only in its locking condition.

In the chuck disclosed in U.S. Pat. No. 5,558,478, additionally, a prismatic, radially displaceable, engagement member is radially preloaded, by a leaf spring, against a control sleeve which is displaced between its locking and release positions. The control sleeve is resiliently preloaded and is displaceable axially, together with an outer sleeve, in the direction of the power tool in which the chuck is used. Again, the drawback of this chuck consists in that it occupies a stable position only in its locking condition.

In German Publication DE 196 36 293A1, additionally, there is provided a holding member for retaining a control sleeve, which is displaced between engagement and release positions, in each of the sleeve end positions. The holding member is arranged between the control sleeve and the clamp region of the tool chuck. This holding member insures a stable position of the chuck in both its engagement, locking position and its release position. This insures an easy manual replacement of the tool with one hand. For changing the tool, the chuck is brought into its release position. In the chuck release position, the tool is changed. Upon the insertion of a new tool, the holding member releases the control sleeve that is automatically displaced in its engagement or locking position.

The object of the present invention is to provide a chuck with which a one-hand replacement of the tool is effected in a more reliable manner.

SUMMARY OF THE INVENTION

This and other objects of the present invention, which will become apparent hereinafter are achieved by providing a chuck for receiving a tool shank a clamp region of which is provided with close-ended radial recesses extending in axial direction. The chuck includes, radially displaceable engagement members formlockingly engageable in the radial recesses of the clamp region of the tool shank, and an axially displaceable control sleeve for radially displacing the engagement members between their engagement and release positions.

A resilient holding member is arranged between the control sleeve and the clamp region of the tool shank. The resilient holding member has a detent element for preventing displacement of the control sleeve into its locking position from its release position. The control sleeve is displaced into its release position upon insertion of the boring tool against a biasing force of the holding member.

Upon withdrawal of the tool, the holding member immediately releases the control sleeve, and the control sleeve springs into its locking position. Upon its insertion, the tool acts on the engagement members and through them positively displaces the control sleeve in the-direction toward its release position, without ever contacting it. Upon the complete insertion of the tool, the engagement members engage into the recesses of the clamp region of the tool shank, releasing the control sleeve, and the preloaded locking spring biases the control sleeve into its locking position in which the engagement or locking members are radially formlockingly retained in their tool locking position.

Advantageously, the control sleeve is provided with a flange portion. A portion of the control sleeve adjacent to the tool is radially coaxially surrounded by a front sleeve, and the stepped portion of the control sleeve adjacent to the power tool, which has a larger diameter, can be easily grasped by hand for displacing the sleeve axially in the direction toward the power tool.

The control sleeve has a projecting radially inward web which supports the locking spring which is preloaded in a direction toward the power tool. Such an arrangement insures an automatic displacement of the control sleeve into its locking position. The inner surface of the control sleeve forms at least partially a radial stop for the radially displaceable engagement members. At that, the engagement members advantageously radially formlockingly other portions of the chuck. The engagement members apply, with their end surfaces facing in the direction of the power tool, a positive force to the control sleeve, advantageously, to the extending radially inward web of the control sleeve.

Advantageously, the engagement members engage in oriented radially outwardly recesses formed in the extension of the control sleeve and are connected with the control sleeve with a possibility of a limited axial displacement relative thereto.

In a first embodiment of the inventive chuck, the holding member is advantageously formed as a radially resilient leaf spring and is provided with at least partially circumferentially extending connection element. The holding member is also provided with an extending radially inward contact section engageable with the clamp region of the tool shank. The detent element is provided at the outer end of the leaf spring.

The radially displaceable detent element of the holding member is formed as a bent nose at the end of an axially projecting, radially resilient portion of the leaf spring. The nose is formed with two chamfers which cooperate with two associated chamfers provided at the inner end of the control sleeve web, so that the detent element can be displaced radially upon axial displacement of the control sleeve against the biasing force of the holding member. A radially projecting portion of the holding member-forming leaf spring advantageously extends radially downwardly.

In the second embodiment of the inventive chuck, the holding member is formed as a ball surrounded by an axially and radially displaceable opening provided in the chuck. For retaining the tool in the chuck, the holding member engages the clamp region of the tool shank. The spherical cap of the holding member-forming ball forms a two-sided land which cooperates with a radially resilient sleeve-shaped spring provided with two inner chamfers. The spring is supported for an axial displacement and is connected with a control sleeve. The holding member-forming ball, upon being engaged by the spring, impedes the movement of the control sleeve to its locking position.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

Figure 1A:
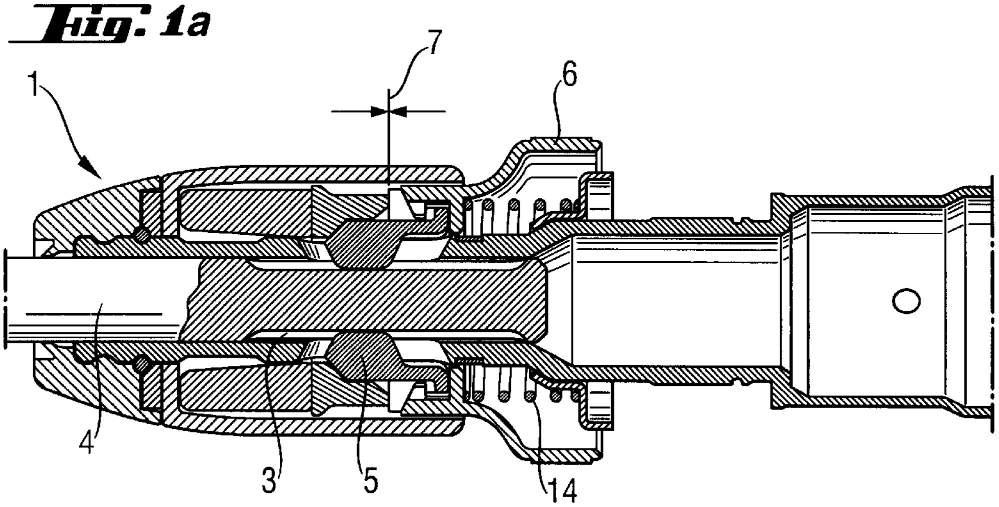
Figure 1B:
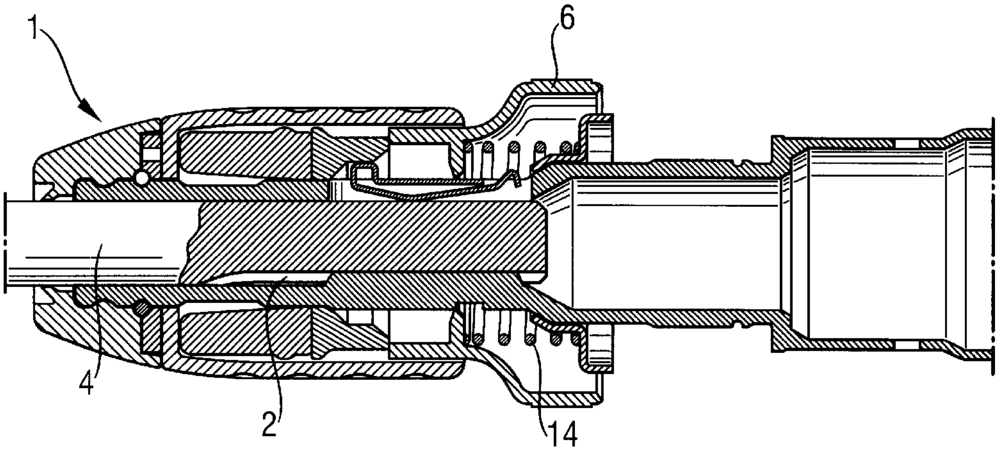
Figure 2A:
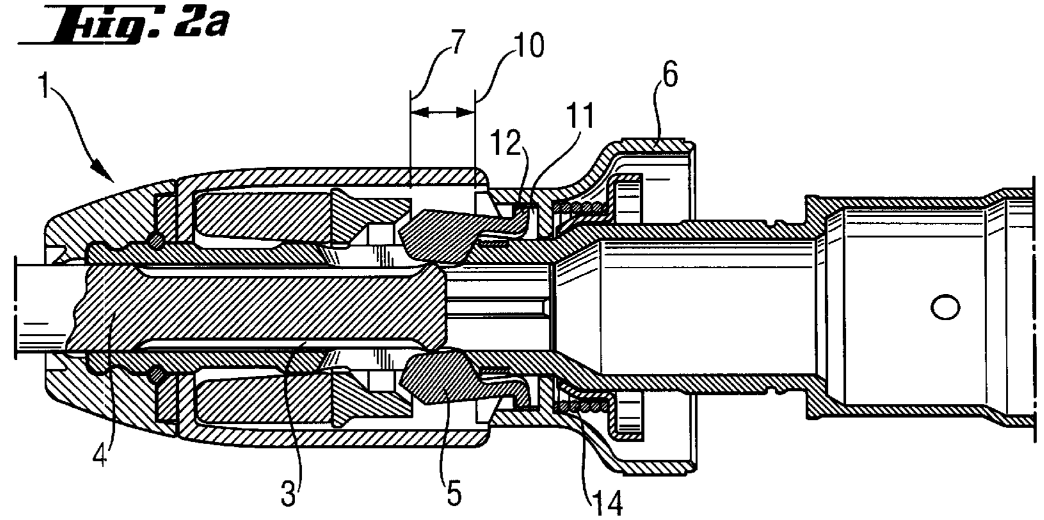
Figure 2B:
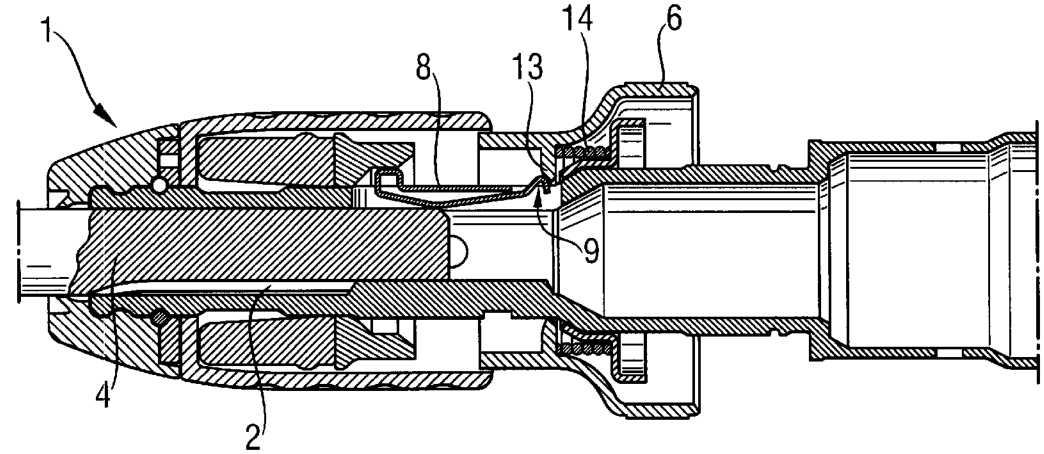
Figure 3A:
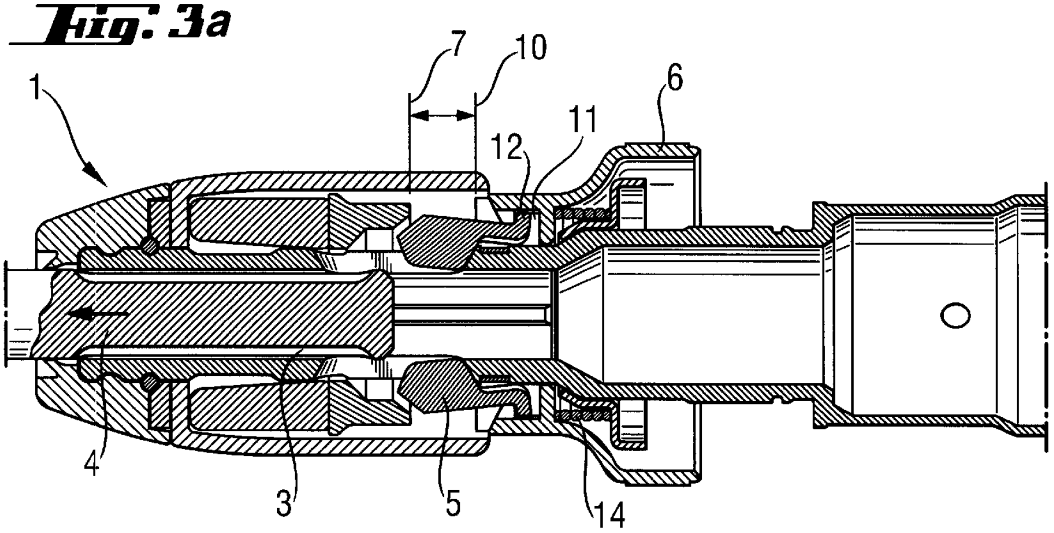
Figure 3B:
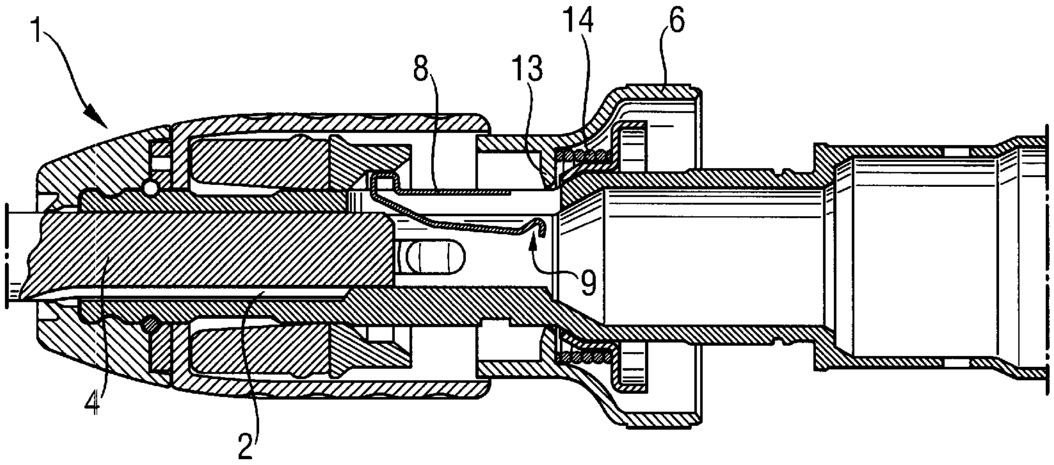
Figure 4A:
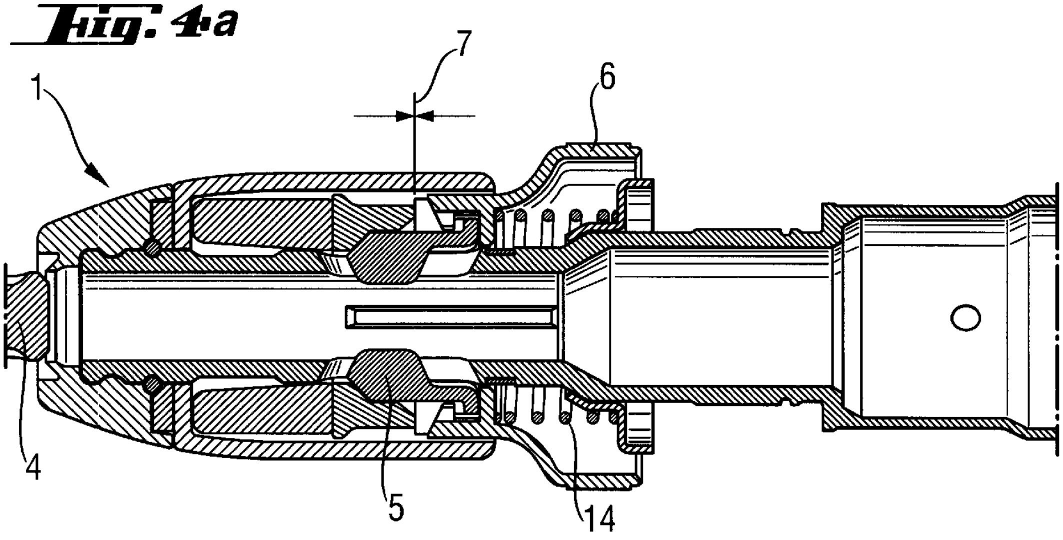
Figure 4B:
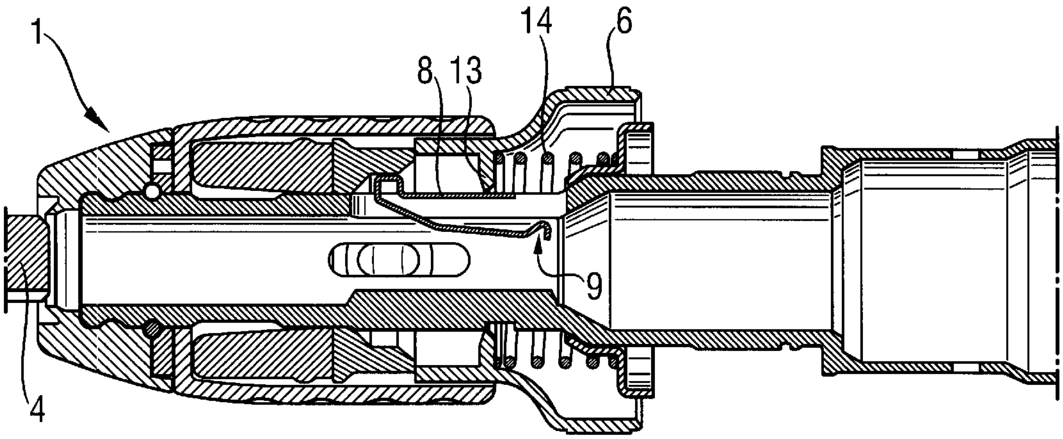
Figure 5A:
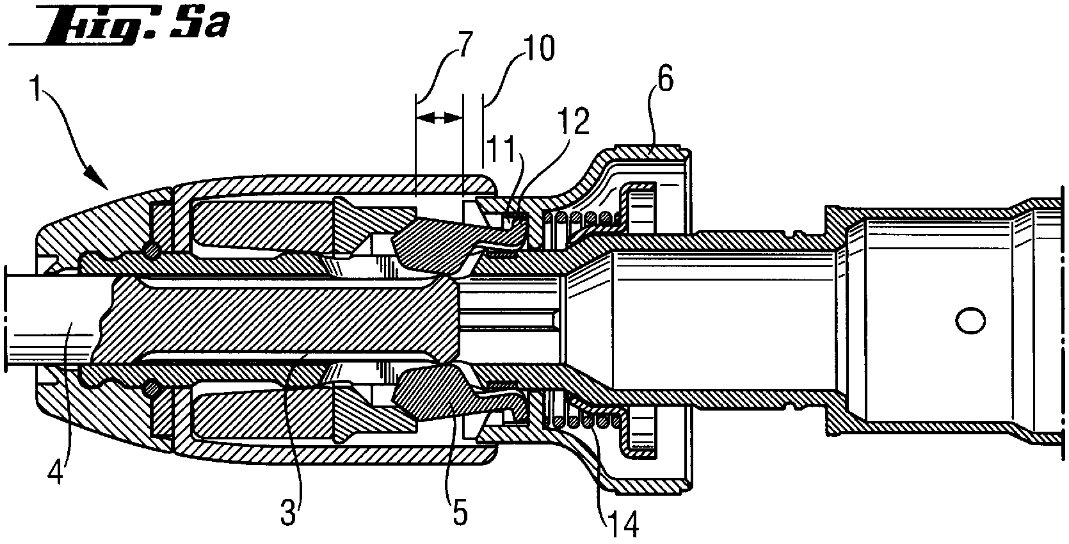
Figure 5B:
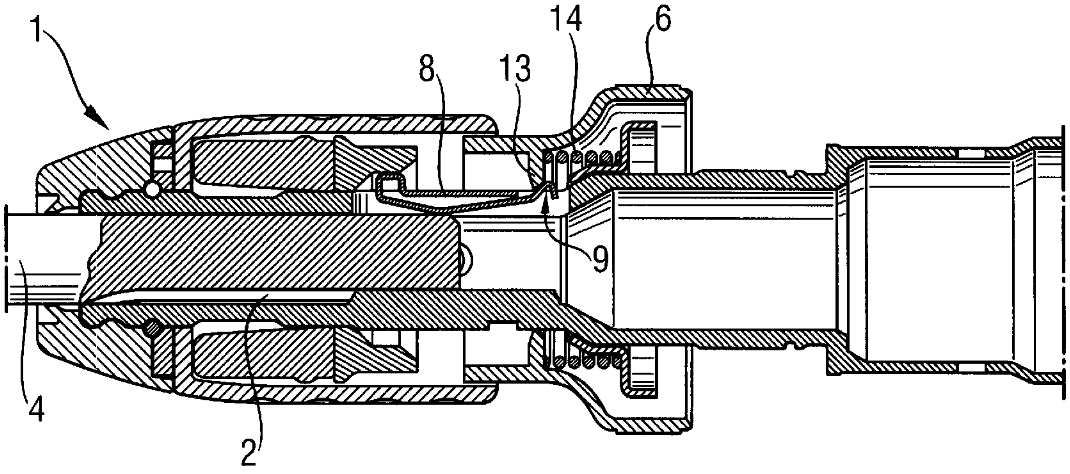
Figure 6A:
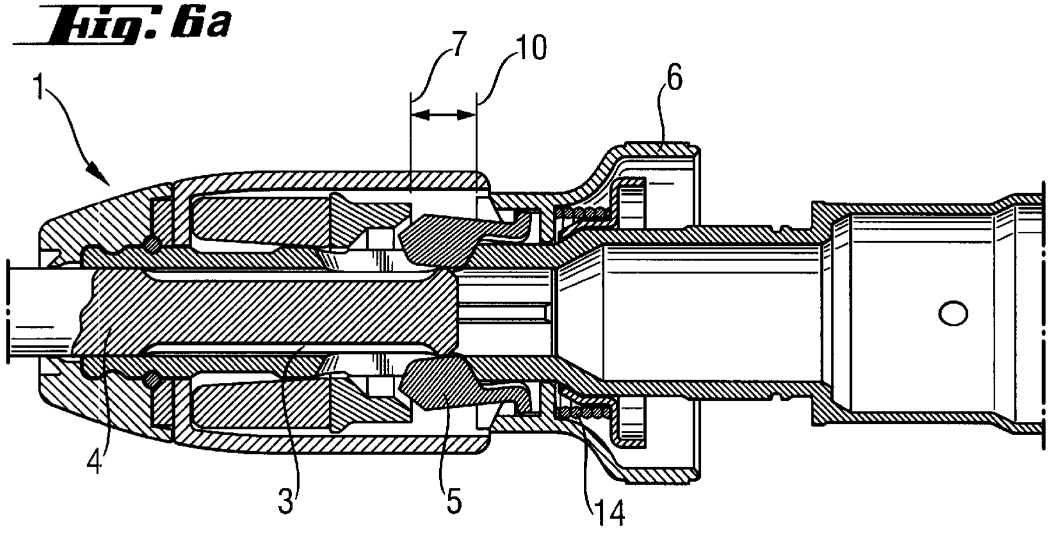
Figure 6B:
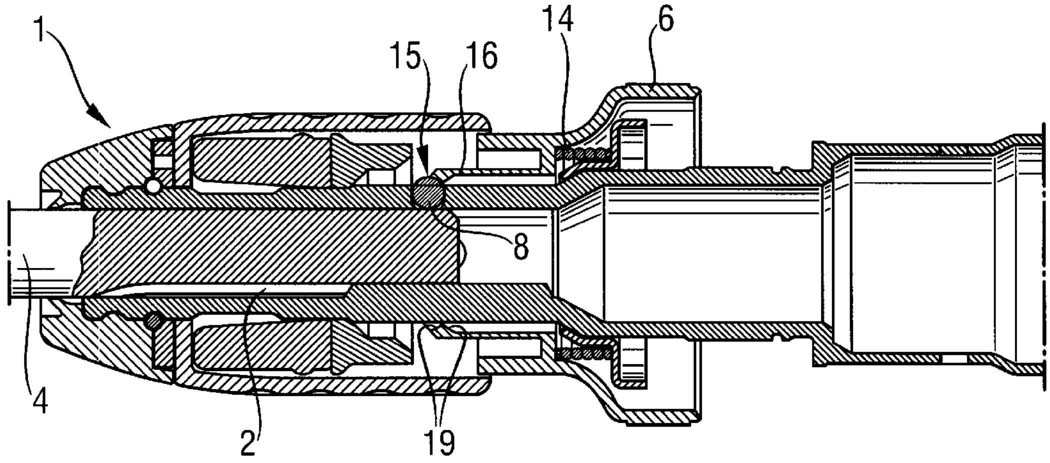
Figure 7:
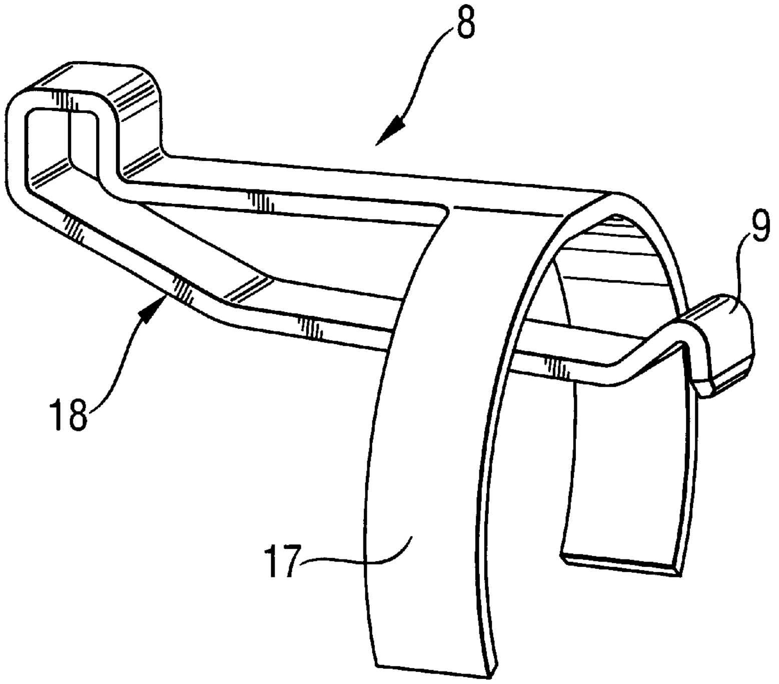
Figure 8:
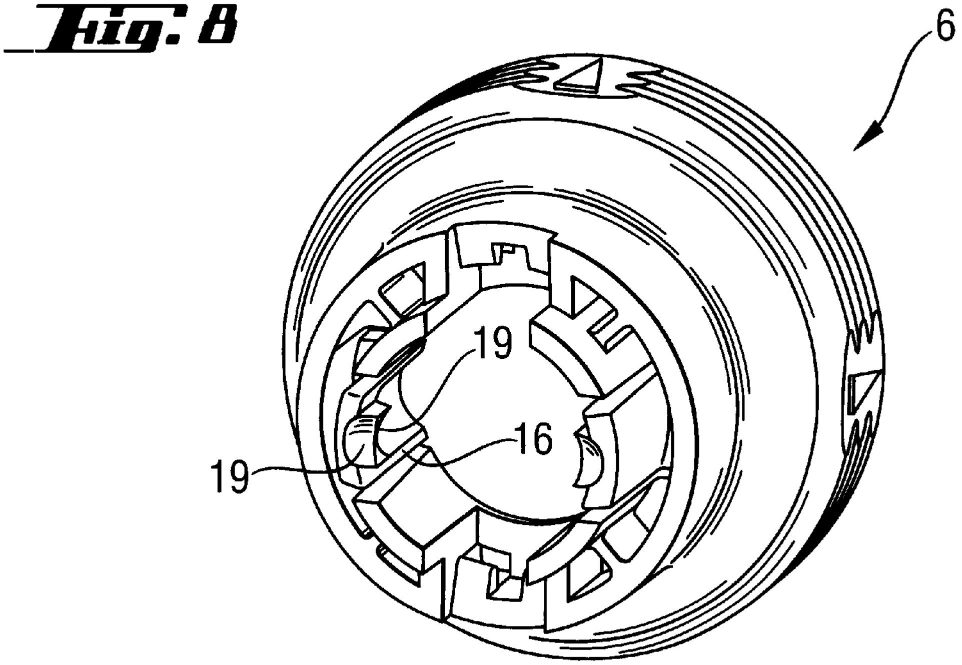

| | |
|---|---|
| FIG. 1a | a cross-sectional view of a first embodiment of a chuck for a boring tool according to the present invention in the chuck locking position; |
| FIG. 1b | a cross-sectional view of the chuck shown in FIG. 1 but turned by 90°; |
| FIG. 2a | a cross-sectional view of the chuck as shown in FIG. 1a in the chuck release position; |
| FIG. 2b | a cross-section view of the chuck as shown in FIG. 1b in the chuck release position; |
| FIG. 3a | a cross-sectional view of the chuck as shown in FIG. 1a during withdrawal of the tool; |
| FIG. 3b | a cross-sectional view of the chuck as shown in FIG. 1b during withdrawal of the tool; |
| FIG. 4a | a cross-sectional view of the chuck as shown in FIG. 1a after the tool has been withdrawn; |
| FIG. 4b | a cross-sectional view of the chuck as shown in FIG. 1b after the tool has been withdrawn; |
| FIG. 5a | a cross sectional view of the chuck as shown in FIG. 1a during the insertion of the tool; |
| FIG. 5b | a cross-sectional view of the chuck as shown in FIG. 1b during insertion of the tool; |
| FIG. 6a | a cross-sectional view of a second embodiment of a chuck for a boring tool according to the present invention in the chuck release position; |
| FIG. 6b | a cross-sectional view of the chuck shown in FIG. 6a but turned by 90°; |
| FIG. 7 | a perspective view of a holding element for a chuck according to the first embodiment; and |
| FIG. 8 | a perspective view of a control sleeve for a chuck according to the second embodiment. |

DETAILED DESCRIPTION OF THE PREFERRED EMBODIMENTS

A chuck 1 for a boring tool 4 according to the present invention, which is shown in FIGS. 1*a* and 1*b*, includes an entraining member 2 in which the boring tool 4 is formlockingly received for joint rotation therewith, and radially displaceable engagement members 5 for engaging the clamp region of the shank of the boring tool 4. The engagement members 5 formlockingly engage in radial slots 3 formed in the clamp region of the tool shank and provide for a limited axial displacement of the tool along a path a length of which corresponds to the length of the slots 3. A control flange-shaped sleeve 6 controls the radial displacement of the engagement members 5 between their engagement and release positions. In FIGS. 1*a*–1*b*, the control sleeve 6 is shown in its locking position 7 in which the boring tool 4 is clamped in the chuck 1.

As particularly shown in FIGS. 2*a*–2*b*, a resilient holding member 8, which is formed as a radially resilient leaf spring, is arranged between the control sleeve 6 and the clamp region of the boring tool shank. The resilient holding member 8 is provided with a radially displaceable detent element 9 which engages the control sleeve 6 and retains the control sleeve 6 in its release position 10 spaced from the control sleeve locking position upon insertion of the tool 4 against the biasing force of the holding member 8. The engagement members 5 are formlockingly received, with a possibility of a very limited axial displacement, in recesses 11 formed in an extension 12 of the control sleeve 6, and are displaceable together with the control sleeve 6 as it is being displaced between its locking and release positions 7 and 10. A radially projecting web 13 of the control sleeve 6 serves as a support for a preloaded locking spring 14. The control sleeve 6 is retained in its release position 10 when the detent element 9 of the holding member 8 engages the radially projecting web 13.

FIGS. 3*a*–3*b* show positions of the chuck elements during the withdrawal of the drilling tool 4. The holding member 8 is in its release position, and there is not any impeding contact of the detent element 9 with the control sleeve 6.

FIGS. 4*a*–4*b* show a position of the chuck 1 in which the locking spring 14, after the withdrawal of the tool 4, pushed the control sleeve 6 back into its locking position.

FIGS. 5*a*–5*b* show a position of the chuck 1 in which the tool 4, upon its insertion, displaces the control sleeve 6, via the engagement members 5, from its locking position 7 to its release position 10, without contacting the control sleeve 6 itself. At that, the holding member 8 occupies a position in which there is not any contact between the detent element 9 and the web 13 that would impede the displacement of the control sleeve 6 to its release position 10.

In the embodiment shown in FIGS. 6*a*–6*b*, the holding member 8 is formed as a ball surrounded by an axially and radially displaceable opening provided in the chuck 1. For retaining the tool 4 in the chuck 1, the holding member 8 engages the clamp region of the tool shank. The spherical cap 15 of the holding member-forming ball forms a two-sided land which cooperates with a radially resilient sleeve-shaped spring 16 provided with two inner chamfers. The spring 16 is supported for an axial displacement and is connected with a control sleeve 6. Therefore, the holding member-forming ball, upon being engaged by the spring 16, impedes the movement of the control sleeve 6 to its locking position 7.

FIG. 7 shows the holding member 8 for use with the first embodiment of the inventive chuck. The holding member 8 is formed, as it has already been discussed above, as a radially resilient leaf spring and is provided with at least partially circumferentially extending, connection element 17, an extending radially inward, contact section 18 engageable with the clamp region of a shank of an insertable tool, and the extending radially outward, detent element 9 engageable with the control sleeve 6. The detent element 9 is formed as a bent nose provided with two opposite chamfers and located at an end of an axially extending, radially resilient portion of the leaf spring. The radially projecting portion of the leaf spring extends radially downward.

FIG. 8 shows the arrangement of the sleeve-shaped spring 16, which has a two-sided chamfer 19 for engaging the spherical cap of the holding member-forming ball, in the control sleeve 6.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A chuck for receiving a tool shank a clamp region of which is provided with close-ended radial recesses (3) extending in axial direction, the chuck (1) comprising radially displaceable engagement members (5) formlockingly engageable in the radial recesses (3) of the clamp region of the took shank; an axially displaceable control sleeve (6) for radially displacing the engagement members between engagement and release position thereof; and a resilient holding member (8) arranged between the control sleeve (6) and the clamp region of the tool shank and having a detent element (9) for preventing displacement of the control sleeve into the locking position (7) thereof from a release position (10) thereof into which the control sleeve (6) was displaced upon insertion of the tool (4) against a biasing force of the holding member (8), wherein the control sleeve (6) has a flange-shaped section adapted to be gripped by a hand for manually displacing the control sleeve (6).

2. A chuck according to claim 1, further comprising a locking spring (14) for biasing the control sleeve (6) into the locking position (7) thereof.

3. A chuck according to claim 1, wherein the control sleeve (6) has a flange-shaped section adapted to be gripped by a hand for manually displacing the control sleeve (6).

4. A chuck according to claim 2, wherein the control sleeve (6) has an extending radially inward web (13) for supporting the locking spring (14).

5. A chuck according to claim 1, wherein the control sleeve (6) has an extension (12) provided with extending radially outwardly recesses (11) in which the engagement members (5) engage.

6. A chuck according to claim 1, wherein the holding member (8) is formed as a leaf spring.

7. A chuck according to claim 6, wherein the holding member (8) has an extending radially inward, contact section (18) for engaging the clamp region of the tool chuck, and wherein the detent element (9) is provided at an end of an axially extending radially resilient portion of the spring.

8. A chuck according to claim 7, wherein the holding member (8) has at least partially circumferentially extending, connection element (17).

9. A chuck according to claim 7, wherein the detent element (9) is formed as bent nose provided with two opposite chamfers.

10. A chuck according to claim 1, wherein the holding member (8) is formed as a ball having a projecting radially outwardly, spherical cap (15).

11. A chuck according to claim 10, further comprising a holding spring cooperating with the holding member-forming ball and formed as radially resilient, axially displaceable, a sleeve-shaped spring (16).

12. A chuck according to claim 11, wherein the sleeve-shaped spring (16) has a two-sided chamfer cooperating with corresponding sides of a land formed in the spherical cap (15), and is connected with the control sleeve.

* * * * *